United States Patent [19]

Ditcher

[11] 3,832,438
[45] Aug. 27, 1974

[54] METHOD OF PROVIDING A GASKET SEAL BETWEEN SEWER PIPE AND MANHOLE OPENING

[75] Inventor: John Ditcher, Langhorne, Pa.
[73] Assignee: A-LOK Corporation, Trenton, N.J.
[22] Filed: Sept. 26, 1972
[21] Appl. No.: 292,342

Related U.S. Application Data
[62] Division of Ser. No. 127,520, March 24, 1971.

[52] U.S. Cl................ 264/274, 29/450, 249/83, 249/145, 277/181, 285/230
[51] Int. Cl............................................. B29f 1/10
[58] Field of Search........ 29/450, 453, 525; 249/11, 249/145 X, 83 X, 95; 277/181, 190, 226; 285/189, 230; 264/274; 62/2

[56] References Cited
UNITED STATES PATENTS

| | | | |
|---|---|---|---|
| 1,090,211 | 3/1914 | Hiatt | 249/95 |
| 2,369,911 | 2/1945 | Lind et al. | 277/226 X |
| 2,683,298 | 7/1954 | Fadden | 249/145 X |
| 2,955,322 | 10/1960 | Hite | 249/83 |
| 3,363,876 | 1/1968 | Moore | 249/145 |
| 3,415,482 | 12/1968 | Schmidgall | 249/145 |
| 3,759,285 | 9/1973 | Yoakum | 285/230 X |

FOREIGN PATENTS OR APPLICATIONS

| | | | |
|---|---|---|---|
| 290,612 | 6/1965 | Netherlands | 285/231 |

Primary Examiner—Charlie T. Moon
Attorney, Agent, or Firm—Synnestvedt & Lechner

[57] ABSTRACT

Providing a leakproof seal between the surface of an opening through the wall of a manhole and the outer surface of a pipe which passes through that opening. An extruded gasket strip, of elastomeric material and of A section, is rooted, by the splayed legs of the A, in the concrete of the manhole wall around said opening. The upper portion of the A yieldingly spans the distance between the surface of the opening and the surface of the pipe. A shaping element is provided to define the shape and character of the surface of the opening and to securely hold the gasket strip while the concrete is being poured to form the manhole wall, and until it has set.

3 Claims, 5 Drawing Figures

PATENTED AUG 27 1974

METHOD OF PROVIDING A GASKET SEAL BETWEEN SEWER PIPE AND MANHOLE OPENING

This is a division, of application Ser. No. 127,520, filed Mar. 24, 1971.

The invention deals with the installation of sanitary sewers, and is particulary concerned with the problem of tightly sealing a manhole against inflow or outflow of liquid, at the points where a sewer pipe passes through its walls.

It may be quite important to keep the interior of a manhole reasonably dry, but this has proved to be a difficult objective to accomplish where pipes pass through a manhole wall. Concrete cannot economically be installed with precisely smooth surfaces. Gaskets and other seals are not always effective in situations of this type. Too often water seeps past them, where irregularities, holes or humps are present in the concrete.

One of the more successful proposals for meeting this need has been the installation of O-rings between suitably shaped collars which surround the pipe and mate with the inner surface of the opening through which the pipe passes. This has not been entirely successful, however, for minor imperfections in the concrete will permit the seepage of moisture past the O-ring gasket. Furthermore, such a gasket must be tight along at least two lines of contact, and this doubles the problem of avoiding irregularities and roughness at any point which comes in contact with the O-ring. Since the O-ring is solid, it is not easily forced into different shapes in order to conform to local irregularities in the surface or to imperfections in concentricity. Since the O-ring can roll upon itself, it needs extraneous fittings to make it stay in place.

Because of the conditions under which sewer pipe is installed, it frequently happens that a section of pipe will lie at an angle to the overall axis of the line, due to subsidence in a muddy trench, lack of care in back filling, or any of numerous other causes. When such a condition arises and affects a section of pipe which is to pass through the wall of a manhole, it is quite important that the opening through which the pipe passes should be so configured as to allow for variations in alinement. That is to say, it should taper inwardly from the outside of the manhole to a selected locus, from which locus it should flare out in the opposite direction, that is, towards the interior of the manhole. The desirability of providing double taper of this sort complicates the problem of installing a tight seal precisely at the locus where the tapered surfaces coincide.

It is an object of the present invention to provide a method for installing a sealing member which yieldingly spans the space between a sewer pipe which passes through the wall of a manhole and the inner surface of the opening through which the pipe passes.

It is an object of the invention to provide shaping elements which will impart the desired configuration to the opening through which the pipe passes, which can be readily installed at the time the manhole is being cast, and readily removed after the concrete sets.

It is an object of this invention to configure shaping elements of the sort just mentioned in such a way as to enable them to receive and securely hold in place an elastomeric gasket which surrounds the entire periphery of the opening and which will hold that gasket element in its intended position with portions thereof extending outwardly from the shaping element to be embedded in the concrete as the manhole is poured.

It is an objective of the invention to provide a gasket structure which can readily be formed by the extrusion of an elastomeric material, and which, as formed, is readily deformable so that it may locally yield to accommodate itself to irregularities in surface or in concentricity as it yieldingly spans the distance between a sewer pipe and the surface of the opening through which the pipe passes.

These and other objectives and advantages of the present invention which may occur to those skilled in the art will become apparent from a perusal of the description which follows, taken together with the accompanying drawings.

According to this invention, a gasket ring having the general configuration of a capital A in cross-section, but with slightly splayed out legs (see FIG. 4), is embedded in the concrete as it is poured to form the cylindrical wall of the manhole and the shaped surface of the opening through which the pipe is to pass. This is illustrated generally in FIG. 1, where the sewer pipe P is shown as it is being installed and in a position where it is about to start compressing the gasket. In FIG. 2 the pipe P is shown fully installed and the gasket is shown in its compressed position, sealing the gap between the sewer pipe and the wall of the opening through which the pipe passes. The inner diameter of the gasket is somewhat smaller than the outer diameter of the sewer pipe P which is to pass through the opening. For instance, where a standard 8 inch I.D. pipe is used, it will have an outside diameter of from 9.4 inches to 9.8 inches. The gasket ring for such a pipe should be about 8.25 inches in inside diameter.

In order to install the gasket at the desired spot, a two-part shaping element is provided which can be positioned between the inner and outer forms used to produce the manhole wall, and which can be readily unbolted and removed after the concrete has set.

Figure 3:
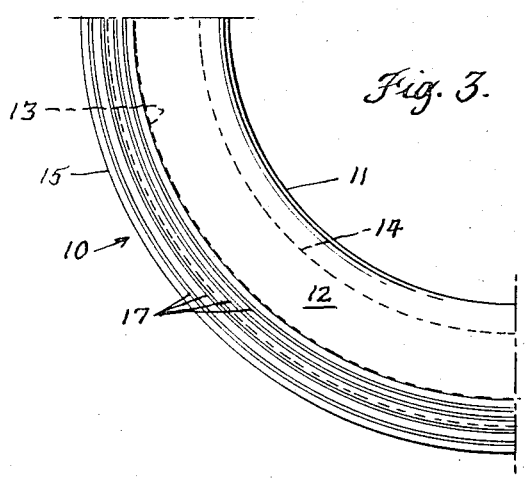
FIG. 3 is a plan view of a fragment of the gasket ring.
Figure 4:
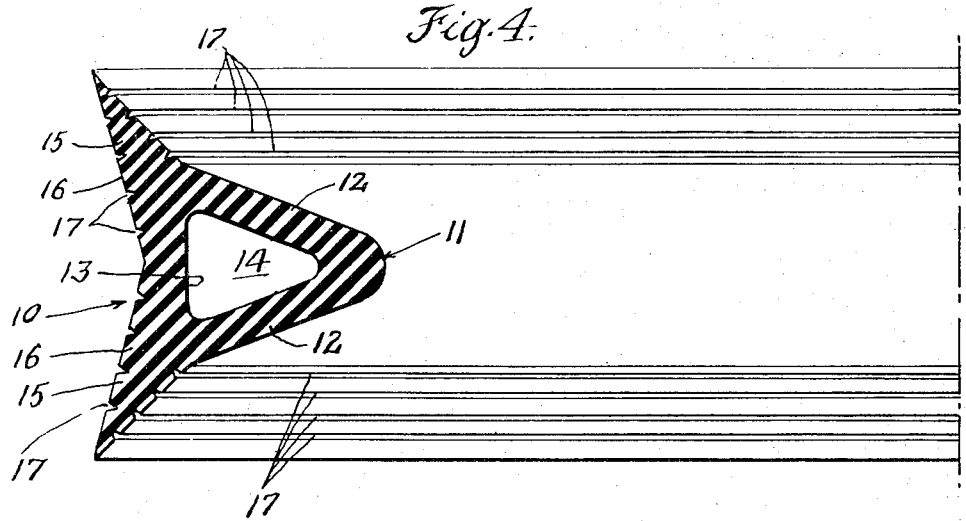
FIG. 4 is an enlarged cross sectional view of the gakset ring.

Considering the gasket ring first, attention is directed to FIGS. 3 and 4, in which the proportions, in cross section, are appropriate for a ring 10 which may be used to surround a pipe P which is 8 inches in inside diameter. The gasket may be made of any resilient elastomeric material which can be extruded to the desired shape. It is preferably made of rubber, in accordance with ASTM Specification C 443 – 63 T.

The peak 11 of the A, for a gasket of this size, may, desirably, be a little more than 2 inches above the base. The legs 12,12 of the upper part of the A diverge at an angle of about 40°, or 20° on each side of the center line of the A, until they reach a point roughly level with the top of the cross bar 13 of the A. At the point, the angle of divergence substantially increases, becoming about 90°, or 45° on each side of the center line. The side walls of the upper portion of the A do not sharply intersect: Rather, the tip of the A is rounded off, at 11, on a radius of about one-fourth inch. The upper walls 12,12 are approximately one-fourth inch in thickness, so that there is a triangular cavity 14 in the center of the gasket.

The lower legs 15,15 of the A are tapered, narrowing to a point at the extreme tip of each leg. The undersurfaces 16,16 of these legs rise from the tip of each leg towards the center at an angle of about 15°. The extreme distance across the base of the A, for a gasket of this size, is about 2¾ inches. The upper line of the cross bar 13 of the A is about five-eighths inch above the base line.

Along the upper (or inner) surface of the splayed out legs and also along the undersurfaces thereof, serrations 17 are provided. These ribs or grooves extend circumferentially of the gasket, as is clearly seen in FIG. 3. They increase the firmness with which the gasket is bonded into the concrete, and also assist in preventing any possible leakage of fluid around the buried surfaces of the gasket itself.

Figure 1:
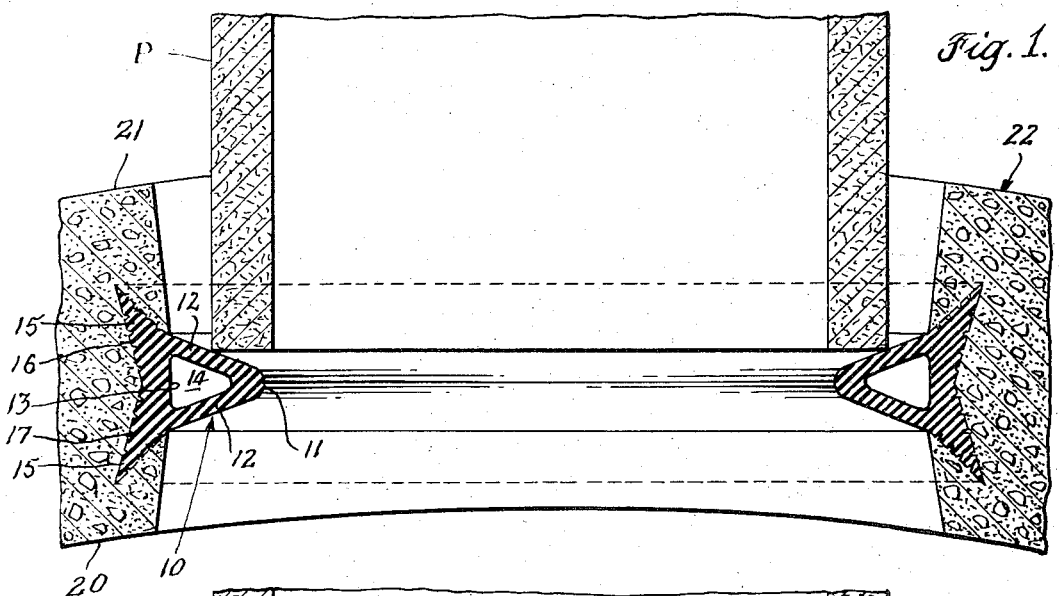
FIG. 1 illustrates a section of ordinary sewer pipe as it is being installed in a manhole equipped with a gasket ring constructed in accordance with the invention.
Figure 2:
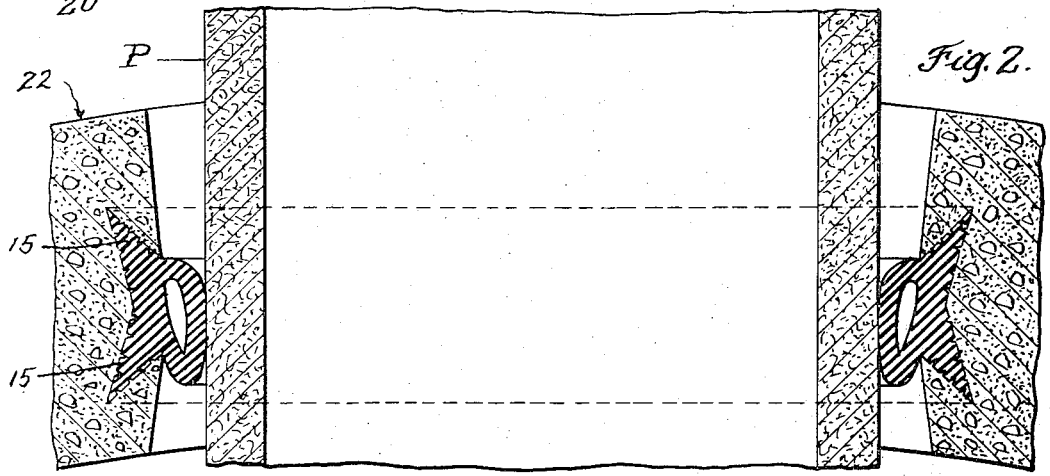
FIG. 2 is a similar view showing the sewer pipe fully installed in the manhole and illustrating the manner in which the gasket ring of the present invention is deformed upon installation of the sewer pipe.

A section of ordinary sewer pipe P is shown in FIGS. 1 and 2. It may be of any suitable material, such as asbestos cement or vitreous clay, and may be of any size. For ordinary purposes, however, it may lose effectiveness at sizes much below 4 inches.

Figure 5:
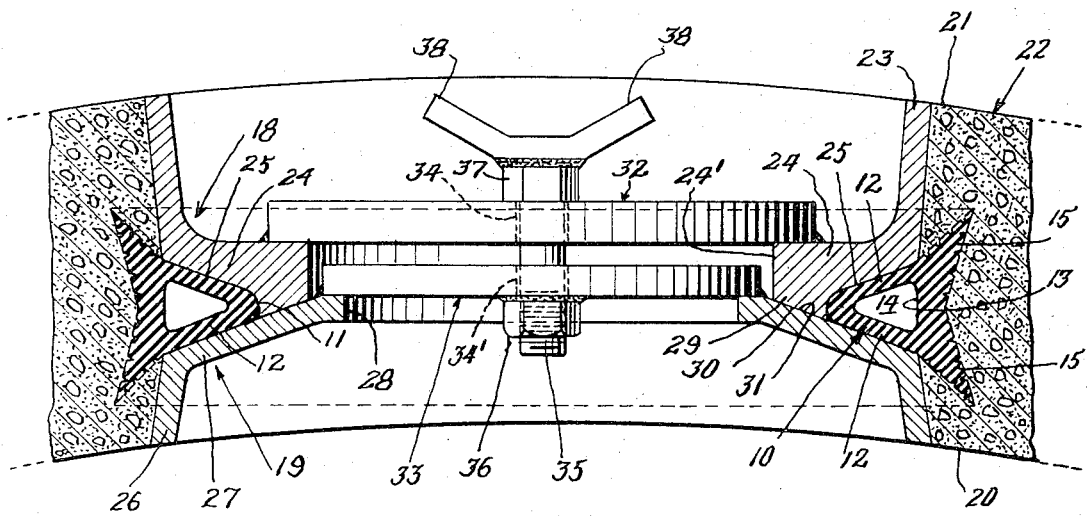
FIG. 5 is a sectional view illustrating a two-part shaping element employed to embed the gasket ring in the manhole wall, as that wall is erected.

As previously indicated, the gasket ring 10 is held in position while the concrete is being poured by means of a two-part shaping element. This is illustrated in FIG. 5, where it is shown as though in horizontal section through the center of the ring. The outer element is generally indicated by the reference number 18; the inner element by the number 19.

The inner wall 20 of the manhole conventionally defines a cylindrical unit about 48 inches in inside diameter. The wall of the manhole is normally about 5 inches thick, thereby producing an overall outside diameter of 58 inches. The exterior surface of the wall is designated 21. The concrete of the manhole wall is indicated at 22 and the gasket ring 10 is shown with its splayed-out legs embedded therein.

The outer shell of the shaping member has a frustoconical shape, with its largest diameter coinciding with the outer line 21 of the manhole. At a point about 2½ inches in from the outer edge, the wall of the form terminates in a flange 24 which extends radially inward, at an angle chosen to match the slope of the adjacent leg 12 of the gasket ring 10.

The sloping surface 25 of the flange 24 terminates in a fillet, adapted to receive the rounded apex 11 of the A-section.

The inner shaping element is likewise frustoconical in shape, with its largest diameter on the inner wall 20 of the manhole. Its frustoconical wall 26 terminates in a flange 27 which extends radially inward to a central opening 28, and this flange slopes at an angle which is equal and opposite to the slope of the corresponding surface 25 of the flange 24 of the outer element, so that the leg portions 12,12 of the gasket will be snugly received between the sloping surfaces of these two flanges.

At the fillet provided to receive the apex 11 of the A, an annular shoulder 29 is formed on the flange 24. This has a surface 30 which is configured to mate with the sloping surface 31 on the upper face of the flange 27. The shoulder 29 operates as a limit means, to prevent the inner and outer forms from being so tightly drawn up as to deform the gasket between them.

The flange 24 terminates in a central opening 24', and this opening is covered by a heavy circular disc 32 of substantial thickness and strength, which is welded to the outer face of the form marginally outward of the opening 24'. Similarly, the central opening 28 in the flange 27 of the inner form is closed by a heavy plate or disc 33, which is welded to the flange 27 marginally outwardly of the opening 28.

The plates 32 and 33 are each provided with a central bore, 34,34', through which the threaded bolt 35 projects, after passing through the threaded nut 36 which is welded to the inner surface of the plate 33 in a position to surround the bore 34'. The bolt 35 is engaged at its opposite end by the nut 37, to which I prefer to weld a pair of wings 38,38 to facilitate tightening the nut and securing the parts quite firmly together.

It should be noted that the gasket ring is an extruded article. It is cut to a length which is exactly equal to the desired inner diameter. Its ends are firmly bonded together to make it a continuous circle. This means that the inner rim of the gasket will be under compression normally, while the outer rim is under considerable tension, as it expands to accommodate the larger diameter. In order to prevent wrinkling and creasing of the rubber, it is quite desirable that the mating faces of the inner and outer forms should fit the gasket ring quite accurately.

Attention should be given to the angle at which the legs of the A splay out from the zone immediately below the line of the cross bar 13 of the A. This angle has been determined after considerable experiment as probably being the angle which affords the firmest bond with the concrete, so that the gasket will not be torn out "by the roots" so to speak when the pipe is inserted, and so that the gasket legs which form peripheral webs will snap into diverging planes when positioned in the form and will best hold their shapes under the stress imposed, while the concrete sets.

The form used in positioning the gasket in accordance with this invention is mounted between the inner and outer shells which constitute the form for constructing the manhole wall. The outer shell is erected first and the network of reinforcing rods is set up within it. The rods are preferably bent to accommodate and position the shaping elements, which are assembled, with the gasket in place, before being inserted between the reinforcing rods. The inner shell is then installed and the space between the shells is filled with concrete.

After the concrete has set, the wedges which hold the outer shell together are removed, and the shell is disassembled, whereupon the outer shaping element 18 can be unbolted from the inner one, 19, and removed. Thereafter, the inner shell of the manhole form is similarly removed, and the inner portion of the form 19 is readily lifted out of the opening. That portion of the gasket which represents the apex of the A is left, projecting into the opening.

It will be seen that the present invention affords a simple and extremely effective method for tightly sealing manhole openings to pipe which passes through such openings. Yet there is ample freedom for movement under vibration or other stress, without impairing the tightness of the seal and without subjecting either the pipe or the manhole structure to contact with metallic collars or flanges which might, under vibrational stress, deliver hammerlike chocks which could in time result in fracture of the pipe. The mechanism required is easy to install and easy to produce, and is not costly to manufacture.

The invention has been described primarily with reference to sewer installation, for that is the area in which it is presently believed that it will demonstrate its greatest value. Obviously, however, it can be adapted to the installation of tubing or conduit of diverse shapes and for diverse purposes, without significantly departing from the spirit of the present disclosure.

I claim:

1. The method of using an extruded tubular gasket having the cross-sectional configuration of a capital A to form a seal between the inner surface of an opening in a masonry wall and the outer surface of a pipe adapted to pass through said opening, which method comprises the steps of positioning a gasket of said cross-sectional configuration in a recess formed between the mating edges of a pair of oppositely tapered mold forms, said recess being configured to receive and hold only that portion of said gasket which corresponds to the apex of the A, but to leave the webs which correspond to the legs of the A projecting outwardly from said mold; bolting the mold forms together, to consolidate them with said gasket; mounting the mold forms in the opening in said masonry wall; infilling the space between the mold form and the inner surfaces of said opening with settable material, so as to fill that space and embed the outwardly projecting webs corresponding to the legs of the capital A in said settable material; and removing the mold parts after the settable material has set, so as to leave that portion of the gasket which was not embedded in the settable material projecting into the space intended to receive the pipe.

2. The method of claim 1 wherein the mold parts are circular in section and the opening provided by removal of the mold is likewise circular.

3. The method of constituting a resilient seal between an opening in a masonry wall and a pipe which passes through said opening, which method includes the use of extruded tubing of elastomeric material having a shape in cross section analogous to that of a capital A and which method includes the steps of positioning and clamping a length of such tubing which is less than the outer circumference of such pipe between the rims of a pair of interconnectible mold parts which are configured to receive and retain the apex-shaped portion of said tubing but to allow the divergent webs which constitute the legs of the A to project outwardly beyond the circumference of said mold parts, said mold being mounted within the opening in the said wall; casting a mass of settable material between the inner surfaces of said opening and the outer surface provided by the peripheral contours of said mold parts, thus embedding the webs which project beyond the mold in said settable material; allowing the material to set; and separating and removing the mold parts so as to leave exposed the portion of said gasket which corresponds to the apex of the A, so that inserting such a pipe in the opening so provided will impose compressive stress on the exposed portion of said tubing.

* * * * *